(12) United States Patent
Liu

(10) Patent No.: US 12,101,722 B2
(45) Date of Patent: Sep. 24, 2024

(54) RANDOM ACCESS MESSAGE TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 17/630,865

(22) PCT Filed: Aug. 2, 2019

(86) PCT No.: PCT/CN2019/099066
§ 371 (c)(1),
(2) Date: Jan. 27, 2022

(87) PCT Pub. No.: WO2021/022411
PCT Pub. Date: Feb. 11, 2021

(65) Prior Publication Data
US 2022/0272638 A1 Aug. 25, 2022

(51) Int. Cl.
*H04W 52/14* (2009.01)
*H04W 48/10* (2009.01)
(Continued)

(52) U.S. Cl.
CPC ......... *H04W 52/146* (2013.01); *H04W 48/10* (2013.01); *H04W 72/21* (2023.01); *H04W 74/0833* (2013.01)

(58) Field of Classification Search
CPC ....... H04W 4/08; H04W 24/10; H04W 52/04; H04W 52/146; H04W 52/30;
(Continued)

(56) References Cited

U.S. PATENT DOCUMENTS 8,494,572 B2 * 7/2013 Chen ..................... H04W 52/16
455/522
9,491,712 B2 * 11/2016 Chen ................... H04W 52/146
(Continued)

FOREIGN PATENT DOCUMENTS

RU 2671966 C1 11/2018

OTHER PUBLICATIONS

Russian Patent Application No. 2022105629, Office Action dated Oct. 18, 2022, 8 pages.
(Continued)

*Primary Examiner* — Quochien B Vuong
(74) *Attorney, Agent, or Firm* — Cozen O'Connor

(57) ABSTRACT

A method for transmitting a random access message, executed by a base station, includes: configuring a specified power difference range for a terminal; and receiving a first random access message sent by the terminal according to a first transmission power. The first transmission power include a first power of a Physical Random Access Channel (PRACH) of the first random access message and a second power of a Physical Uplink Shared Channel (PUSCH) of the first random access message, and a difference between the first power and the second power is within the specified power difference range.

20 Claims, 4 Drawing Sheets obtain a specified power difference range configured by base station — 201 send a first random access message to base station based on a first transmission power, the first transmission power includes a first power of the PRACH of the first random access message and a second power of the PUSCH of the first random access message, a difference between the first power and the second power is within the specified power difference range — 202

(51) Int. Cl.
*H04W 72/21* (2023.01)
*H04W 74/0833* (2024.01)

(58) Field of Classification Search
CPC . H04W 52/34; H04W 72/04; H04W 72/0473; H04W 72/21; H04W 74/002; H04W 74/004; H04W 74/006; H04W 74/0833; H04W 74/0836
See application file for complete search history.

(56) References Cited

U.S. PATENT DOCUMENTS

| | | | |
|---|---|---|---|
| 10,542,562 B2 * | 1/2020 | Amuru | H04W 48/12 |
| 11,395,343 B2 * | 7/2022 | Vos | H04W 74/004 |
| 2020/0245373 A1 * | 7/2020 | Xiong | H04W 74/0833 |

OTHER PUBLICATIONS

Russian Patent Application No. 2022105629, English translation of Office Action dated Oct. 18, 2022, 7 pages.
European Patent Application No. 19940244.7, Search and Opinion dated Jul. 15, 2022, 13 pages.
Nokia et al. "On 2-step RACH Procedure" 3GPP TSG RAN WG1 #97; R1-1906747; May 2019; 23 pages.
Nokia et al. "Feature lead summary#3 on 2 step RACH procedures" 3GPP TSG RAN WG1 #97; R1-1907900; May 2019; 59 pages.
Qualcomm Incorporated "Procedures for Two-Step RACH" 3GPP TSG-RAN WG1 Meeting #97; R1-1907256; May 2019; 13 pages.
Huawei, et al. "Further discussion on 2-step RACH procedure" 3GPP TSG RAN WG1 Meeting #96bis; R1-1903924; Apr. 2019; 4 pages.

* cited by examiner

RANDOM ACCESS MESSAGE TRANSMISSION METHOD AND APPARATUS, AND STORAGE MEDIUM

CROSS-REFERENCE TO RELATED APPLICATION

This application is a national phase of International Application No. PCT/CN2019/099066, filed on Aug. 2, 2019, the content of which is hereby incorporated by reference in its entirety.

TECHNICAL FIELD

The disclosure relates to a field of radio communication technologies, and more particularly, to methods and devices for transmitting a random access message, and storage medium.

BACKGROUND

In the field of cellular mobile communication technology, in order to cope with increasing communication demands of mobile data, a new radio (NR) system has been developed. In the NR system, a terminal can initiate an access to a base station through a two-step random access manner. In the related art, a first step in the two-step random access initiated by the terminal in the NR system is to send a first random access message (MsgA) to the base station. The MsgA involves a Physical Random Access Channel (PRACH) and a Physical Uplink Shared Channel (PUSCH). Correspondingly, the base station can perform a subsequent Automatic Gain Control (AGC) estimation based on the PRACH of the first random access message.

SUMMARY

According to a first aspect of embodiments of the disclosure, a method for transmitting a random access message is provided. The method is executed by a base station. The method includes:

configuring a specified power difference power for a terminal; and receiving a first random access message sent by the terminal based on a first transmission power, in which the first transmission power includes a first power of a Physical Random Access Channel (PRACH) of the first random access message and a second power of a Physical Uplink Shared Channel (PUSCH) of the first random access message, and a difference between the first power and the second power is within the specified power difference range.

According to a second aspect of embodiments of the disclosure, a method for transmitting a random access message is provided. The method is executed by a terminal. The method includes:

obtaining a specified power difference range configured by a base station;

sending a first random access message to the base station based on a first transmission power, in which the first transmission power includes a first power of a Physical Random Access Channel (PRACH) of the first random access message and a second power of a Physical Uplink Shared Channel (PUSCH) of the first random access message, and a difference between the first power and the second power is within the specified power difference range.

In one embodiment, a device for transmitting a random access message is provided. The device is applied to a base station. The base station includes:

a processor; and a memory, configured to store instructions executable by the processor;

in which the processor is configured to execute the method for transmitting a random access message as described above.

According to a third aspect of embodiments of the disclosure, a device for transmitting a random access message is provided. The device is applied to a terminal. The device includes:

a processor; and a memory, configured to store instructions executable by the processor; in which the processor is configured to execute the method for transmitting a random access message as described above.

According to a fourth aspect of embodiments of the disclosure, a computer readable storage medium is provided. The computer readable storage medium includes executable instructions. A processor of a terminal is configured to call the executable instructions to perform a method for transmitting a random access message as described above.

It is to be understood that the above general description and the detailed description below are only exemplary and do not limit the disclosure.

BRIEF DESCRIPTION OF THE DRAWINGS

In order to explain technical solutions in embodiments of the disclosure clearly, brief descriptions will be made to the drawings used in embodiments below. Obviously, the drawings in the following description are only some embodiments of the disclosure. For those skilled in the art, other drawings can be obtained based on these drawings without any creative work.

DETAILED DESCRIPTION

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the disclosure. On the contrary, they are merely examples of devices and methods consistent with some aspects of the disclosure as detailed in the appended claims.

It should be understood that the term "several" mentioned in this disclosure refers to one or more, and the "plurality" refers to two or more. The term "and/or" describes the association relationship of the associated objects, indicating that there can be three types of relationships. For example, A and/or B means: only A, both A and B, and only B. The character "/" generally indicates that the associated objects before and after are in an "or" relationship.

With the development of wireless communication technologies, mobile data is growing rapidly. In order to meet communication needs of the rapidly growing mobile data, standard development has been performed on the fifth-generation (5G) mobile communication technology, also known as two-step random access of the new radio (NR) technology.

Figure 1:
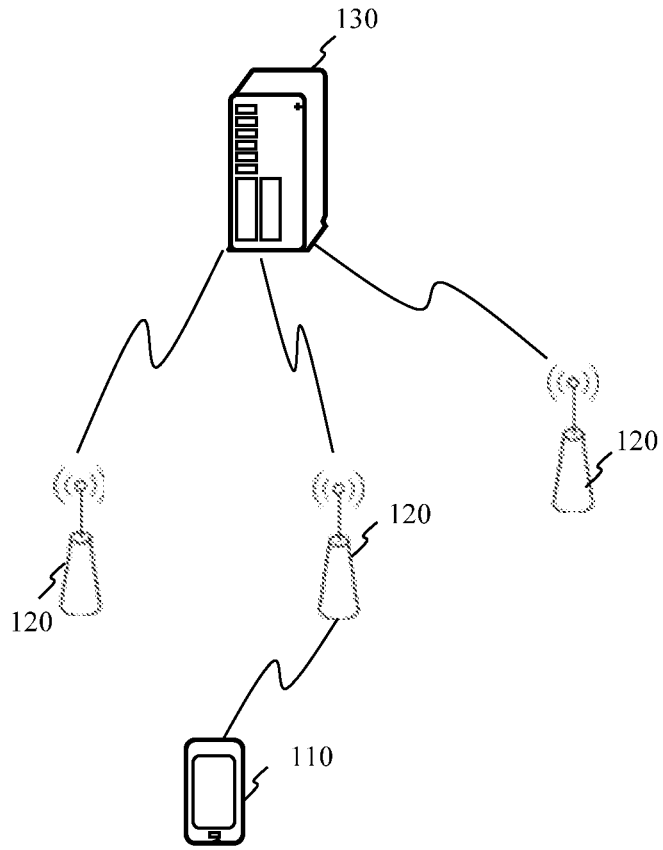
FIG. 1 is a schematic structural diagram illustrating a wireless communication system according to embodiment of the disclosure.

As illustrated in FIG. 1, FIG. 1 is a schematic structural diagram illustrating a wireless communication system according to embodiments of the disclosure. As illustrated in FIG. 1, the mobile communication system is a communication system based on cellular mobile communication technology. The mobile communication system may include several terminals 110 and several base stations 120.

The terminal 110 may be a device that provides voice and/or data connectivity to the user. The terminal 110 can communicate with one or more core networks via a radio access network (RAN). The terminal 110 can be an Internet of Things terminal, such as a sensor device, a mobile phone (or called "cellular" phone), or a computer having the Internet of Things terminal, such as a fixed device, a portable device, a pocket-sized device, a handheld device, a computer built-in device, or a vehicle-mounted device, for example, station (STA), subscriber unit, subscriber station, mobile station, mobile, remote station, access point, remote terminal, access terminal, user terminal, user agent, user device, or user equipment. In some examples, the terminal 110 may also be a device of an unmanned aerial vehicle.

The base station 120 may be a network side device in the wireless communication system. The wireless communication system may be a 5G system, also known as a new radio (NR) system. In some examples, the wireless communication system may also be a next-generation of the 5G system.

The base station 120 may be a base station (gNB) adopting a central distributed architecture in the 5G system. When the base station 120 adopts the central distributed architecture, the base station usually includes a central unit (CU) and at least two distributed units (DUs). The central unit is provided with a Packet Data Convergence Protocol (PDCP), a Radio Link Control (RLC), and a Media Access Control (MAC) protocol stack. The distributed unit is provided with a physical (PHY) layer protocol stack. Embodiments of the disclosure do not limit the specific implementation of the base station 120.

A wireless connection between the base station 120 and the terminal 110 can be established through a wireless air interface. In different embodiments, the wireless air interface may be a wireless air interface based on the fifth-generation (5G) mobile communication technology. For example, the wireless air interface is a new radio. In some examples, the wireless air interface may be a wireless air interface of a next-generation mobile communication technology of the 5G.

In some examples, the above-mentioned wireless communication system may further include a network management device 130.

The several base stations 120 are connected to the network management device 130 respectively. The network management device 130 may be a core network device in the wireless communication system. For example, the network management device 130 may be a Mobility Management Entity (MME) in an Evolved Packet Core (EPC). In some examples, the network management device may also be other core network devices, such as a Serving GateWay (SGW), a Public Data Network GateWay (PGW), a Policy and Charging Rules function (PCRF) or a Home Subscriber Server (HSS), etc. The implementation of the network management device 130 is not limited in embodiments of the disclosure.

In the NR system, when the terminal adopts the two-step random access, the terminal can send a first random access message, i.e., MsgA, to the base station. After successfully receiving the MsgA, the base station can send back a second random access message (also called MsgB) to the terminal. The MsgA sent by the terminal to the base station is composed of content sent on a Physical Random Access Channel (PRACH) and content sent on the Physical Uplink Shared Channel (PUSCH), and these two contents are transmitted by adopting Time Division Multiplexing (TDM) technology. Therefore, in a possible implementation, when the base station receives the MsgA sent by the terminal, the base station can perform an Automatic Gain Control (AGC) estimation on the reception power of the PUSCH of the MsgA based on a reception situation of the PRACH of the MsgA (such as the detected power of the PRACH).

However, since there may be a certain power gap between the transmission power of the PRACH of the MsgA and the transmission power of the PUSCH of the MsgA, when the above-mentioned power gap is large, it may cause an inaccurate result of the AGC estimation performed by the base station on the reception power of the PUSCH of the MsgA, affect the reception performance of the PUSCH of the MsgA and even lead to demodulation failure.

Figure 2:
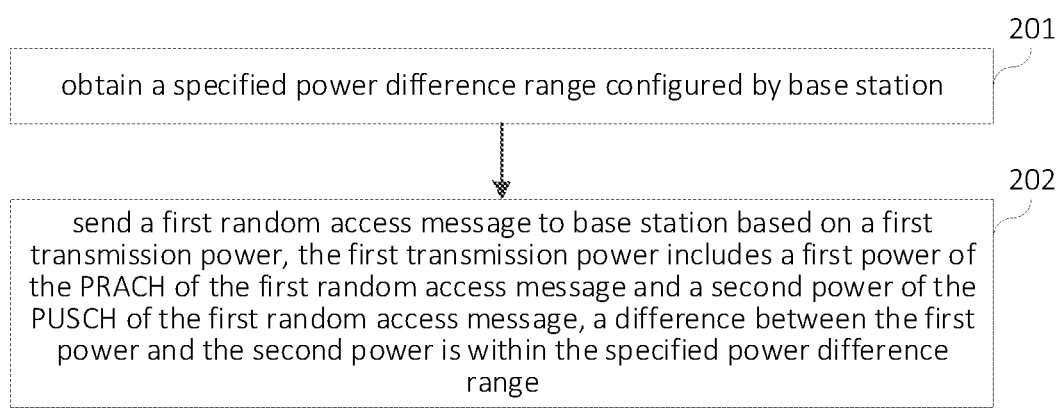
FIG. 2 is a flowchart illustrating a method for transmitting a random access message according to embodiments of the disclosure.

In order to avoid the above-mentioned problems, embodiments of the disclosure provide a method for transmitting a random access message. As illustrated in FIG. 2, FIG. 2 is a flowchart illustrating a method for transmitting a random access message according to embodiments of the disclosure. The method for transmitting a random access message may be applied to the wireless communication system illustrated in FIG. 1 and executed by the terminal in FIG. 1. The method may include the following.

In step 201, a specified power difference range configured by a base station is obtained.

In step 202, a first random access message is sent to the base station based on a first transmission power. The first transmission power includes a first power of the Physical Random Access Channel (PRACH) of the first random access message and a second power of the Physical Uplink Shared Channel (PUSCH) of the first random access message. A difference between the first power and the second power is within the specified power difference range.

The above-mentioned first random access message may be the MsgA in two-step random access.

In some examples, obtaining the specified power difference range configured by the base station includes receiving a system message sent by the base station through a physical broadcast channel; and obtaining the specified power difference range indicated by the system message.

In some examples, the first random access message carries power relationship indication information. The power relationship indication information is configured to indicate a magnitude relationship between the first power and the second power.

In some examples, the power relationship indication information is contained in uplink control information UCI carried in the first random access message.

In some examples, the power relationship indication information is contained in the uplink control information UCI carried in the PUSCH of the first random access message.

In some examples, when a retransmission condition is met, a second transmission power is obtained and the first random access message is retransmitted with the second transmission power.

The second transmission power includes a third power of the PRACH of the first random access message and a fourth power of the PUSCH of the first random access message, a difference between the third power and the fourth power is within the specified power difference range, the third power is greater than or equal to the first power, and the fourth power is greater than the second power.

In some examples, obtaining the second transmission power includes the following.

A first power adjustment instruction is obtained. The first power adjustment instruction is an instruction configured by a system signaling.

A second transmission power is obtained by adjusting the first transmission power based on the first power adjustment instruction.

In some examples, obtaining the second transmission power includes the following.

When the retransmission condition is that no second random access message returned by the base station is received within a specified period after the first random access message is sent, the first power adjustment instruction is acquired. The first power adjustment instruction is an instruction configured by a system signaling.

The second transmission power is obtained by adjusting the first transmission power based on the first power adjustment instruction.

In some examples, obtaining the second transmission power includes the following.

When the retransmission condition is that a specified type of second random access message returned by the base station is received within a specified period after the first random access message is sent, a second power adjustment instruction is acquired. The second power adjustment instruction is an instruction carried in the specified type of second random access message.

A second transmission power is obtained by adjusting the first transmission power based on the second power adjustment instruction.

In some examples, the method further includes the following.

When the retransmission condition is met, if the first power reaches a maximum power of the PRACH of the first random access message, or the second power reaches a maximum power of the PUSCH of the first random access message, a transmission beam of the first random access message is switched.

In conclusion, in the solution according to embodiments of the disclosure, when the terminal transmits the MsgA in two-step random access, the terminal can control the difference between the first power of the PRACH of the MsgA and the second power of the PUSCH of the MsgA based on the configuration from the base station, such that the difference between the first power and the second power is within the specified power difference range, to prevent a case where a deviation of the result occurs when the base station compensates the transmission power of the PUSCH of the MsgA based on the reception situation of the PRACH of the MsgA, thereby improving the reception performance of the PUSCH of the MsgA by the base station.

Figure 3:
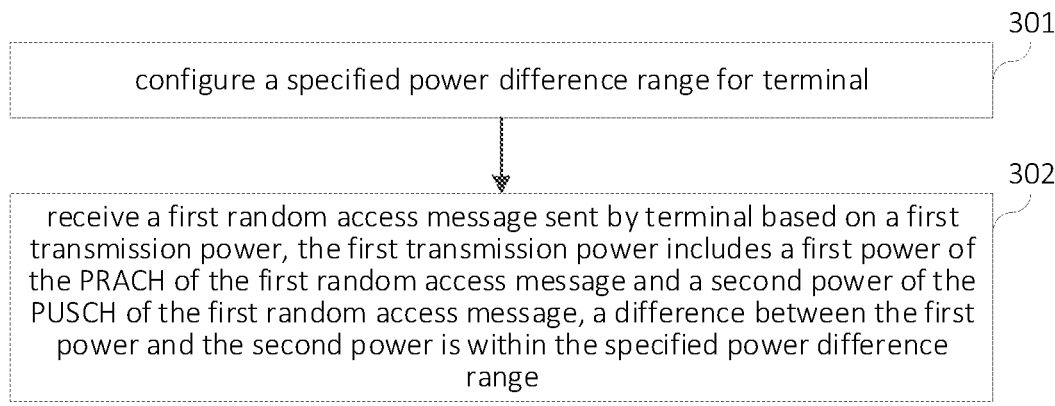
FIG. 3 is a flowchart illustrating a method for transmitting a random access message according to embodiments of the disclosure.

As illustrated in FIG. 3, FIG. 3 is a flowchart illustrating a method for transmitting a random access message according to embodiments of the disclosure. The method for transmitting a random access message can be applied to the wireless communication system illustrated in FIG. 1 and executed by the base station in FIG. 1. The method may include the following.

In step 301, a specified power difference range is configured for a terminal.

In step 302, a first random access message sent by the terminal based on a first transmission power is received. The first transmission power includes a first power of the PRACH of the first random access message and a second power of the PUSCH of the first random access message. A difference between the first power and the second power is within a specified power difference range.

In some examples, configuring the specified power difference range for terminal includes sending a system message indicating the specified power difference range through a physical broadcast channel.

In some examples, the method further includes compensating a reception power of the PUSCH of the first random access message based on the specified power difference range while receiving the first random access message.

In some examples, compensating the reception power of the PUSCH of the first random access message based on the specified power difference range while receiving the first random access message includes the following.

Power relationship indication information carried in the first random access message is received. The power relationship indication information is configured to indicate a magnitude relationship between the first power and the second power.

While receiving the first random access message, the reception power of the PUSCH of first random access message is compensated based on the specified power difference range and the power relationship indication information.

In some examples, obtaining the power relationship indication information carried in the first random access message includes the following.

The power relationship indication information is obtained from uplink control information (UCI) in the PUSCH of the first random access message.

In some examples, obtaining the power relationship indication information from the uplink control information (UCI) in the first random access message includes the following.

The power relationship indication information is obtained from the uplink control information (UCI) in the PUSCH of the first random access message.

In some examples, the method further includes the following.

When content in the PRACH of the first random access message is successfully parsed and content in the PUSCH of the first random access message is unsuccessfully parsed, a specified type of second random access message is returned to the terminal.

The specified type of second random access message includes a second power adjustment instruction. The second power adjustment instruction is configured to instruct the terminal to adjust the first transmission power to obtain a second transmission power configured for retransmitting the first random access message.

In conclusion, with the solution according to embodiments of the disclosure, the difference between the first power of the PRACH of the MsgA and the second power of the PUSCH of the MsgA is controlled when the MsgA in the two-step random access is transmitted between the base station and the terminal, such that the difference between the first power and the second power is within the specified power difference range, to prevent a case where a large deviation of the result occurs while the base station compensates the reception power of the PUSCH of the MsgA based on the reception situation of the PRACH of the MsgA, thereby improving the reception performance of the PUSCH of the MsgA by the base station.

Figure 4:
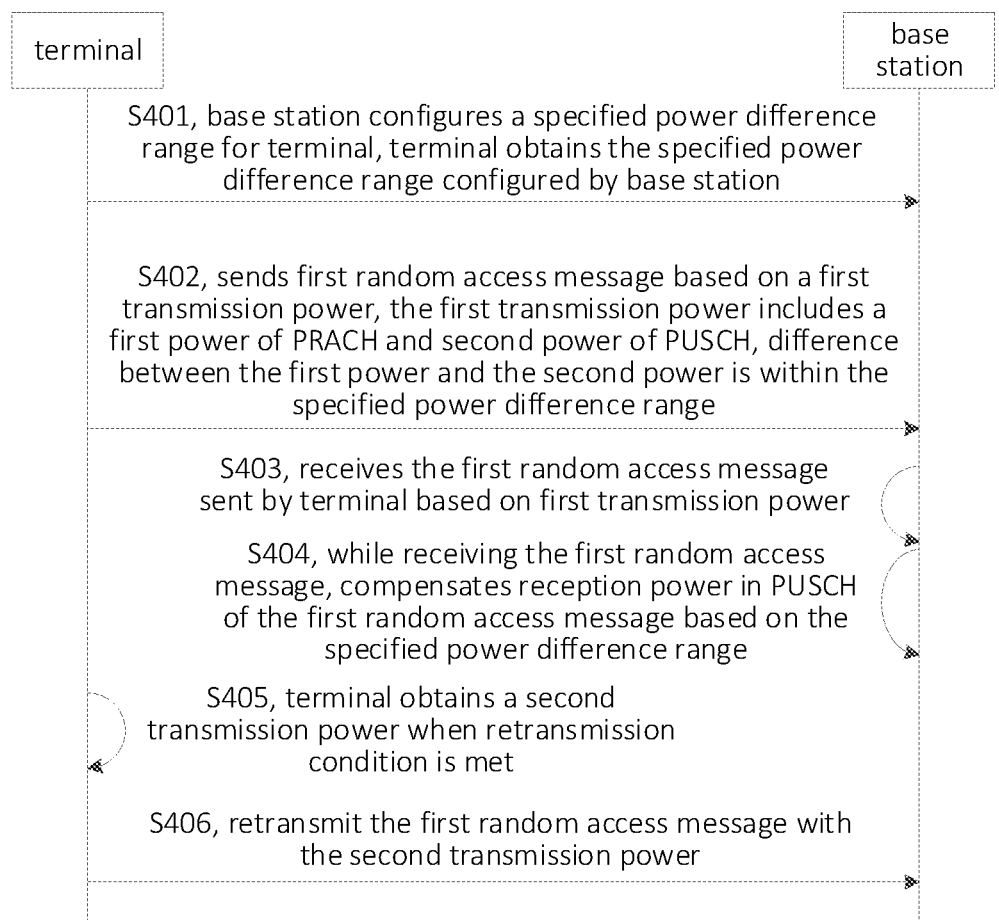
FIG. 4 is a flowchart illustrating a method for transmitting a random access message according to embodiments of the disclosure.

As illustrated in FIG. 4, FIG. 4 illustrates a method for transmitting a random access message according to embodiments of the disclosure. The method can be applied to the wireless communication system illustrated in FIG. 1 and executed by the terminal and base station in FIG. 1. The method may include the following.

In step 401, the base station configures a specified power difference range for the terminal, and the terminal obtains the specified power difference range configured by the base station.

In embodiments of the disclosure, before the terminal initiates the random access to the base station, the base station can configure a specified power difference (also called Gap) range between the transmission power of the PRACH and the transmission power of the PUSCH in the two-step random access or a maximum Gap value for the terminal.

The transmission power of the PRACH and the transmission power of the PUSH may be energy per resource element (EPRE) on each resource element (RE).

In some examples, when the base station configures the specified power difference range for the terminal, the base station may send a system message indicating the specified power difference range through a physical broadcast channel. Correspondingly, when the terminal acquires the specified power difference range configured by the base station, the terminal can receive the system message sent by the base station through the physical broadcast channel and acquire the specified power difference range indicated by the system message.

For example, in an exemplary solution, the base station may send a Master Information Block (MIB) carrying range indication information through a physical broadcast channel. Before initiating access to the base station, the terminal detects the Main Information Block sent by the base station on the physical broadcast channel, obtains the range indication information carried in the Main Information Block and obtains the specified power difference gap based on the range indication information.

In a possible implementation, the above-mentioned range indication information may directly carry the above-mentioned specified power difference range, i.e., the above-mentioned Gap range or the maximum Gap value.

In another possible implementation, the above-mentioned range indication information may carry identifier information of the specified power difference range. After obtaining the identifier information carried in the above-mentioned range indication information, the terminal can obtain a corresponding specified power difference range by searching a locally stored set of power difference ranges based on the identifier information.

For example, the terminal can preconfigure and store a set of power difference ranges. The set contains multiple system-preconfigured Gap ranges or multiple maximum Gap values. After the terminal obtains the identifier information carried in the range indication information, the terminal obtains the corresponding Gap range or the maximum Gap value by querying the set of power difference ranges based on the identifier information.

The above-mentioned set of power difference ranges may be pre-configured by the system in the terminal through a RRC signaling, or the above-mentioned set of power difference ranges may be defined through a protocol.

In a possible implementation, the value of the above-mentioned Gap may also be configured by the system through the RRC signaling.

In step 402, the terminal sends a first random access message to the base station based on the first transmission power. The first transmission power includes the first power of the Physical Random Access Channel (PRACH) of the first random access message and the second power of the Physical Uplink Shared Channel (PUSCH) of the first random access message. The difference between the first power and the second power is within the specified power difference range.

The first random access message may be the MsgA. The MsgA contains two parts, i.e., the PRACH and the PUSCH. The PRACH of the MsgA mainly carries a preamble sequence for the random access, and the PUSCH of the MsgA can carry an identifier of the UE (i.e., UE ID). For example, the above UE ID may be one of C-RNTI, temporary C-RNTI, and RA-RNTI.

In some examples, the PUSCH of the MsgA may also carry uplink control information (UCI).

In some examples, the PUSCH of the MsgA may also carry timing information, such as timing advance (TA).

In an exemplary solution, the UE estimates a path loss on a measured power of the synchronization signal block (SSB) sent by the base station through the downlink, calculates the transmission power based on the reception power of the PRACH and the reception power of the PUSCH for transmitting the MsgA. While sending the MsgA, the UE ensures that the difference between the transmission power on the PRACH and the transmission power on the PUSCH is within the Gap.

In a possible implementation, the first random access message carries power relationship indication information. The power relationship indication information is configured to indicate a magnitude relationship between the first power and the second power.

In embodiments of the disclosure, in order to further improve the accuracy of the AGC estimation on the base station side, when the terminal transmits the MsgA, the information for indicating the magnitude relationship between the first power and the second power can be carried in the MsgA.

In some examples, when the first random access message carries the UCI, the UCI may carry the power relationship indication information. For example, the UCI in the above-mentioned first random access message may be carried by the PUSCH of the first random access message.

In other words, in embodiments of the disclosure, when the terminal communicates with the base station, in addition to the Physical Uplink Control Channel (PUCCH) carrying the UCI, the terminal may also introduce the UCI in the first random access message. For example, the UCI may be introduced into the PUSCH of the first random access message. The UCI may carry the above-mentioned power relationship indication information.

For example, the UE may carry 1-bit indication information in the UCI of the PUSCH of the MsgA to indicate the situation of the above-mentioned Gap. For example, the indication information may indicate whether the power of the PUSCH is larger or smaller than the power of the PRACH.

In step 403, the base station receives the first random access message sent by the terminal based on the first transmission power to the base station.

In embodiments of the disclosure, since the content of the PRACH of the MsgA is before the content of the PUSCH of the MsgA in the time domain, the base station may first detect the PRACH in the MsgA, and then detect the PUSCH in the MsgA.

In step 404, while receiving the first random access message, the base station compensates the reception power of the PUSCH of the first random access message based on the specified power difference range.

In an exemplary solution, the base station may compensate the reception power of the PUSCH of the first random access message based on the specified power difference range by means of AGC.

The process of compensating by the base station the reception power of the PUSCH of the first random access message may be performed during the process of receiving by the base station the first random access message. That is, after the base station detects the PRACH (i.e., the preamble sequence) in the first random access message sent by the terminal, the base station can compensate the reception power of the PUSCH based on the detection situation of the PRACH (such as the reception power of the PRACH) in combination with the above-mentioned specified power difference range while subsequently receiving the content on the PUSCH of the first random access message.

For example, in embodiments of the disclosure, after the base station detects the PRACH of the MsgA, the base station can perform the AGC estimation on the PUSCH of the MsgA based on the detected power of the PRACH in the MsgA in combination with the specified power difference range, to well receive the PUSCH of the MsgA.

In some examples, when the reception power of the PUSCH of the first random access message is compensated based on the specified power difference range in the process of receiving the first random access message, the base station may obtain the power relationship indication information carried in the first random access message. The power relationship indication information is configured to indicate the magnitude relationship between the first power and the second power. In the process of receiving the first random access message, the reception power of the PUSCH of the first random access message is compensated based on the specified power difference range and the power relationship indication information.

For example, given that the Gap is [−A, A], the base station takes the Gap range and the relationship between the power of the PUSCH and the power of the PRACH into account to adjust the result of the AGC estimation on the PUSCH based on the received PRACH.

In some examples, for obtaining the power relationship indication information carried in the first random access message, the base station may obtain the power relationship indication information from the uplink control information (UCI) in the first random access message. For example, when the above-mentioned UCI is carried by the PUSCH, the base station may obtain the power relationship indication information from the UCI in the PUSCH of the first random access message.

The position of the above-mentioned power relationship indication information in the PUSCH of the first random access message may be configured by the system, or may also be defined by a protocol.

In some examples, in embodiments of the disclosure, when the base station successfully parses the content of the PRACH of the first random access message and unsuccessfully parses the content of the PUSCH of the first random access message, the base station sends back a specified type of second random access message to the terminal.

The specified type of second random access message includes a second power adjustment instruction. The second power adjustment instruction is configured to instruct the terminal to adjust the first transmission power to obtain a second transmission power for retransmitting the first random access message.

In embodiments of the disclosure, if the base station successfully receives the MsgA, the base station may issue a MsgB. When the base station does not receive the PRACH and the PUSCH of the MsgA, the UE may retransmit the MsgA. In order to indicate the transmission power used for retransmitting the MsgA, the base station may indicate in the MsgB the manner that the UE adjusts the transmission power of the MsgA based on the parsing situation of the MsgA. For example, if the base station receives the PRACH of the MsgA but unsuccessfully parses the PUSCH, the base station feeds back the MsgB having a type of Msg2 from the configured MsgB resources to the UE. The MsgB having the type of Msg2 may carry the above-mentioned second power adjustment instruction.

In step 405, when the retransmission condition is met, the terminal obtains the second transmission power.

The second transmission power includes a third power of the PRACH of the first random access message and a fourth power of the PUSCH of the first random access message. The difference between the third power and the fourth power is within the specified power difference range. The third power is greater than or equal to the first power, and the fourth power is greater than the second power.

In embodiments of the disclosure, the above-mentioned retransmission condition may be that no second random access message returned by the base station is received within a specified period after the first random access message is sent, or a specified type of second random access message (i.e., the MsgB having the type of Msg2) returned by the base station is received within a specified period after the first random access message is sent.

When the UE retransmits the MsgA, the UE can synchronously increase the transmission power of the PRACH and the transmission power of PUSCH of the MsgA, or separately increase the power of the PRACH or the power of the PUSCH with the difference between the two not exceeding the above-mentioned Gap range.

In some examples, for acquiring the second transmission power, the base station may acquire the first power adjustment instruction which is an instruction configured by the system through a RRC signaling and adjust the first transmission power based on the first power adjustment instruction to obtain the second transmission power.

In a possible implementation, regardless of the above retransmission condition, when retransmitting the MsgA, the UE can adjust the first transmission power used for the last transmission based on the first power adjustment instruction pre-configured by the system. The above adjustment can maintain the synchronous increase of the transmission power of the PRACH and the transmission power of the PUSCH of the MsgA, or can separately increase the power of the PRACH or the power of the PUSCH.

The first power adjustment instruction may be configured by a system signaling. For example, the first power adjustment instruction may be configured by the system through the RRC signaling when the terminal previously accesses the system, or the first power adjustment instruction may be configured by the base station through a broadcast signaling.

In some examples, for acquiring the second transmission power, when the retransmission condition is that no second random access message returned back by the base station is received within a specified period after the first random access message is sent, the terminal acquires the first power adjustment instruction which is an instruction configured by the system signaling and adjusts the first transmission power based on the first power adjustment instruction to obtain the second transmission power.

When the retransmission condition is that the specified type of second random access message returned by the base station is received within the specified period after the first random access message is sent, the terminal obtains the second power adjustment instruction that is an instruction carried in the specified type of second random access message and adjusts the first transmission power based on the second power adjustment instruction to obtain the second transmission power.

In another possible implementation, the UE supports both the pre-configured first power adjustment instruction and the second power adjustment instruction configured by the base station via the MsgB, and selects a corresponding power adjustment instruction based on the specific retransmission condition. For example, when the UE does not receive any type of MsgB returned by the base station, the UE can use the pre-configured first power adjustment instruction to adjust the first transmission power. After the UE receives the MsgB having the type of Msg2 fed back by the base station, the UE can adjust the first transmission power based on the second power adjustment instruction carried in the MsgB having the type of Msg2, to obtain the second transmission power. That is, when the UE retransmits the MsgA (i.e., PRACH+PUSCH), the UE can synchronously increase the transmission power of the PRACH and the transmission power of the PUSCH of the MsgA based on the instruction, or increase the power of the PUSCH in the MsgA separately based on the instruction, while ensuring that the difference between the transmission power of the PRACH and the transmission power of the PUSCH in the MsgA is within the above-mentioned Gap range.

The information of the second power adjustment instruction may be as shown in Table 1 below.

TABLE 1

| | |
|---|---|
| Retransmission of MsgA | synchronously increase the power of PRACH and the power of PUSCH |
| Retransmission of PUSCH | only increase the power of PUSCH |

As shown in Table 1, when the second power adjustment instruction is Retransmission of MsgA, the UE can synchronously increase the transmission power of the PRACH and the transmission power of the PUSCH of the MsgA. That is, the same power is added to the first power and the second power to obtain the third power and fourth power.

When the second power adjustment instruction is Retransmission of PUSCH, the UE can keep the transmission power of the PRACH of the MsgA unchanged, and increase the transmission power of the PUSCH of the MsgA separately, until the difference between the transmission power of the PUSCH of the MsgA and the transmission power of the PRACH of the MsgA exceeds the Gap range.

In some examples, when the retransmission condition is met, if the first power reaches the maximum power of the PRACH of the first random access message, or the second power reaches the maximum power of the PUSCH of the first random access message, the transmission beam of the first random access message is switched.

In embodiments of the disclosure, when the transmission power of retransmitting by the UE the PUSCH or the PRACH of the MsgA is maximum, the UE needs to change the beam for retransmission, where the Gap range remains unchanged after the beam is changed.

In step 406, the terminal retransmits the first random access message with the second transmission power.

In embodiments of the disclosure, after obtaining the second transmission power, the terminal may retransmit the first random access message based on the second transmission power.

In conclusion, with the solution according to embodiments of the disclosure, when the base station and the terminal transmits the MsgA in two-step random access, the first power of the PRACH of the and the second power of the PUSCH of the MsgA can be controlled through the configuration from the base station, such that the difference between the first power and the second power is within the specified power difference range, thereby preventing that a large deviation of the result occurs when the base station compensates the reception power of the PUSCH of the MsgA based on the reception situation of the PRACH of the MsgA. Therefore, the reception performance of the PUSCH of the MsgA by the base station is improved.

In addition, with the solution according to embodiments of the disclosure, the terminal can indicate the magnitude relationship between the transmission power of the PRACH and the transmission power of the PUSCH of the MsgA, such that the base station can accurately perform the AGC estimation on the PUSCH of MsgA based on the reception situation of the PRACH of the MsgA, to further improve the reception performance of the PUSCH of the MsgA by the base station.

The following are device embodiments of the disclosure, which can be configured to implement the method embodiments of the disclosure. Details that are not disclosed in these embodiments of the disclosure can refer to the method embodiments of the disclosure.

Figure 5:
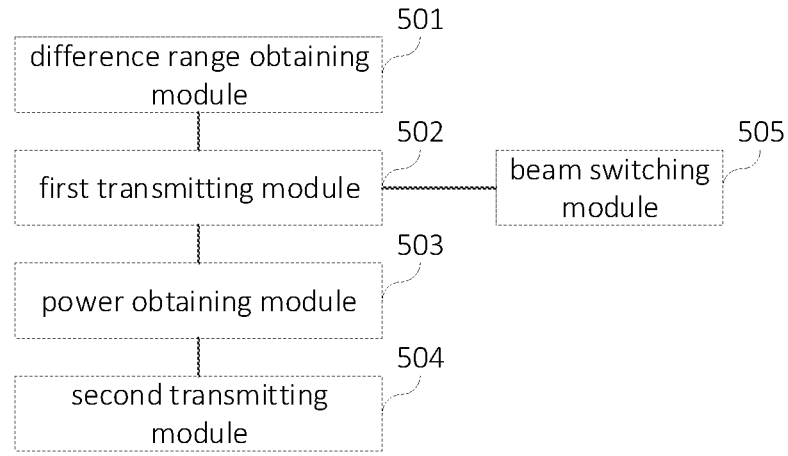
FIG. 5 is a block diagram illustrating a device for transmitting a random access message according to embodiments of the disclosure.

FIG. 5 is a block diagram illustrating a device for transmitting a random access message according to an exemplary embodiment. As illustrated in FIG. 5, the device for transmitting a random access message can implement all or some parts of the wireless communication system illustrated in FIG. 1 through a combination of software and hardware, to execute the steps executed by the terminal in any one of embodiments illustrated in FIG. 2 or FIG. 4. The device for transmitting a random access message may include a difference range obtaining module 501 and a first transmitting module 502.

The difference range obtaining module 501 is configured to obtain a specified power difference range configured by a base station.

The first transmitting module 502 is configured to transmit a first random access message to a base station based on a first transmission power. The first transmission power includes a first power of a Physical Random Access Channel (PRACH) of the first random access message and a second power of a Physical Uplink Shared Channel (PUSCH) of the first random access message. A difference between the first power and the second power is within the specified power difference range.

In some examples, the difference range obtaining module 501 includes a system message receiving submodule and a difference range obtaining submodule.

The system message receiving submodule is configured to receive a system message sent by the base station through a physical broadcast channel.

The difference range obtaining submodule is configured to obtain the specified power difference range indicated by the system message.

In some examples, the first random access message carries power relationship indication information. The power relationship indication information is configured to indicate a magnitude relationship between the first power and the second power.

In some examples, the power relationship indication information is contained in uplink control information (UCI) carried in the first random access message.

In some examples, the power relationship indication information is contained in the uplink control information (UCI) carried in the PUSCH of the first random access message.

In some examples, the device further includes a power obtaining module 503 and a second transmitting module 504.

The power obtaining module 503 is configured to obtain a second transmission power when a retransmission condition is met.

The second transmitting module 504 is configured to retransmit the first random access message with the second transmission power.

The second transmission power includes a third power of the PRACH of the first random access message and the fourth power of the PUSCH of the first random access message. A difference between the third power and the fourth power is within the specified power difference range. The third power is greater than or equal to the first power, and the fourth power is greater than the second power.

In some examples, the power obtaining module 503 includes a first instruction obtaining submodule and a first adjusting submodule.

The first instruction obtaining submodule is configured to obtain a first power adjustment instruction. The first power adjustment instruction is an instruction configured by a system signaling.

The first adjusting submodule is configured to adjust the first transmission power based on the first power adjustment instruction to obtain the second transmission power.

In some examples, the power obtaining module 503 includes a second instruction obtaining submodule and a second adjusting submodule.

The second instruction obtaining submodule is configured to obtain a first power adjustment instruction in response to the retransmission condition being that no second random access message sent back by the base station is received within a specified period after the first random access message is sent. The first power adjustment instruction is configured by a system signaling.

The second adjusting submodule is configured to adjust the first transmission power based on the first power adjustment instruction to obtain the second transmission power.

In some examples, the power obtaining module 503 includes a third instruction obtaining submodule and a third adjusting submodule.

The third instruction obtaining submodule is configured to obtain a second power adjustment instruction in response to the retransmission condition is that a specified type of second random access message sent back by the base station is received within a specified period after the first random access message is received. The second power adjustment instruction is carried by the specified type of second power access message.

The third adjusting submodule is configured to adjust the first transmission power based on the second power adjustment instruction to obtain the second transmission power.

In some examples, the device further includes a beam switching module 505.

The beam switching module 505 is configured to switch a transmission beam of the first random access message in response to that the first power equals to a maximum power of the PRACH of the first random access message or the second power equals to a maximum power of the PUSCH of the first random access message, based on the retransmission condition being met.

Figure 6:
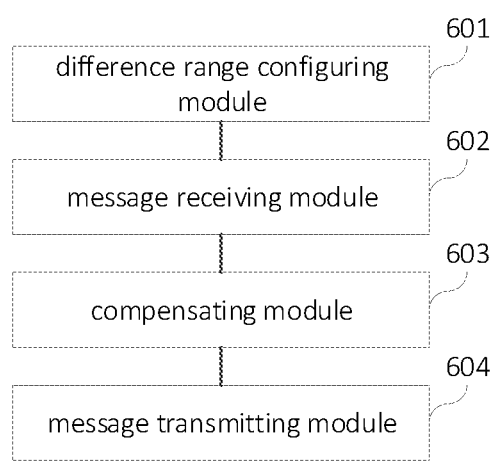
FIG. 6 is a block diagram illustrating a device for transmitting a random access message according to embodiments of the disclosure.

FIG. 6 is a block diagram illustrating a device for transmitting a random access message according to an exemplary embodiment. As illustrated in FIG. 6, the device for transmitting a random access message can implement all or some parts of the wireless communication system illustrated in FIG. 1 through a combination of software and hardware, to execute the steps executed by the base station in any one of embodiments illustrated in FIG. 3 or FIG. 4. The device for transmitting a random access message may include a difference range configuring module 601 and a message receiving module 602.

The difference range configuring module 601 is used to configure a specified power difference range for the terminal.

The message receiving module 602 is configured to receive a first random access message sent by the terminal based on a first transmission power. The first transmission power includes a first power of a Physical Random Access Channel (PRACH) of the first random access message and a second power of a Physical Uplink Shared Channel (PUSCH) of the first random access message. The difference between the first power and the second power is within the specified power difference range.

In some examples, the difference range configuring module is configured to send a system message indicating the specified power difference range through a physical broadcast channel.

In some examples, the device further includes a compensating module 603.

The compensating module 603 is configured to compensate a reception power of the PUSCH of the first random access message based on the specified power difference range while receiving the first random access message.

In some examples, the compensating module 603 includes an indication information obtaining module and a compensating submodule.

The indication information obtaining submodule is configured to obtain power relationship indication information carried by the first random access message. The power relationship indication information is configured to indicate a magnitude relationship between the first power and the second power.

The compensating submodule is configured to compensate the reception power of the PUSCH of the first random access message based on the specified power different range and the power relationship indication information, while receiving the first random access message.

In some examples, the indication information obtaining submodule is configured to obtain the power relationship indication information from uplink control information (UCI) of the first random access message.

In some examples, the indication information obtaining submodule is configured to obtain the power relationship indication information from the uplink control information (UCI) of the PUSCH of the first random access message.

In some examples, the device further includes a message transmitting module 604.

The message transmitting module 604 is configured to configured to send a specified type of second random access message back to the terminal in response to successfully parsing content of the PRACH of the first random access message and unsuccessfully parsing content of the PUSCH of the first random access message.

The specified type of second random access message includes a second power adjustment instruction, and the second power adjustment instruction is configured to instruct the terminal to adjust a first transmission power to obtain a second transmission power for retransmitting the first random access message.

It should be noted that, when the device according to the above embodiments realizes its functions, the division of the above-mentioned functional modules is merely used as an example for illustration. In actual applications, the above-mentioned functions can be allocated by different functional modules according to actual needs. That is, the content structure of the device is divided into different functional modules to complete all or part of the functions described above.

Regarding the device in the foregoing embodiment, the specific manner that each module performs the operation has been described in detail in the embodiment of the method, and a detailed description will not be given here.

An exemplary embodiment of the disclosure provides a device for transmitting a random access message, which can implement all or part of the steps performed by a terminal in embodiments illustrated in FIG. 2 or FIG. 4 of the disclosure. The device for transmitting a random access message includes: a processor and a memory configured to store instructions executable by the processor.

The processor is configured to obtain a specified power difference range configured by a base station; and send a first random access message to the base station based on a first transmission power. The first transmission power includes a first power of a Physical Random Access Channel (PRACH) of the first random access message and a second power of a Physical Uplink Shared Channel (PUSCH) of the first random access. A difference between the first power and the second power is within the specified power difference range.

In some examples, obtaining the specified power difference range configured by the base station includes receiving system information sent by the base station through a physical broadcast channel; and obtaining the specified power difference range indicated by the system information.

In some examples, the first random access message carries power relationship indication information, and the power relationship indication information is configured to indicate a magnitude relationship between the first power and the second power.

In some examples, the power relationship indication information is contained in uplink control information (UCI) carried by the first random access message.

In some examples, the power relationship indication information is contained in the uplink control information (UCI) carried by the PUSCH of the first random access message.

In some examples, the processor is further configured to obtain a second transmission power in response to meeting a retransmission condition; and retransmit the first random access message with the second transmission power.

The second transmission power includes a third power of the PRACH of the first random access message and a fourth power of the PUSCH of the first random access message, a difference between the third power and the fourth power is within the specified power difference range, the third power is greater than or equal to the first power, and the fourth power is greater than or equal to the second power.

In some examples, obtaining the second transmission power includes obtaining a first power adjustment instruction, in which the first power adjustment instruction is configured by a system signaling; and obtaining the second transmission power by adjusting the first transmission power based on the first power adjustment instruction.

In some examples, obtaining the second transmission power includes obtaining a first power adjustment instruction in response to the retransmission condition being that no second random access message sent back by the base station is received within a specified period after the first random access message is sent, in which the first power adjustment instruction is configured by a system signaling; and obtaining the second transmission power by adjusting the first transmission power based on the first power adjustment instruction.

In some examples, obtaining the second transmission power includes obtaining a second power adjustment instruction in response to the retransmission condition being that a specified type of second random access message sent back by the base station is received within a specified period after the first random access message is received, in which the second power adjustment instruction is carried by the specified type of second power access message; and obtaining the second transmission power by adjusting the first transmission power based on the second power adjustment instruction In some examples, the processor is further configured to switch a transmission beam of the first random access message in response to that the first power equals to a maximum power of the PRACH of the first random access message or the second power equals to a maximum power of the PUSCH of the first random access message, based on the retransmission condition being met.

An exemplary embodiment of the disclosure provides a device for transmitting a random access message, which can implement all or part of the steps performed by a base station in embodiments illustrated in FIG. 3 or FIG. 4 of the disclosure. The device for transmitting a random access message includes: a processor and a memory configured to store instructions executable by the processor.

The processor is configured to configure a specified power difference range for a terminal; and receive a first random access message sent by the terminal based on a first transmission power.

The first transmission power includes a first power of a Physical Random Access Channel (PRACH) of the first random access message and a second power of a Physical Uplink Shared Channel (PUSCH) of the first random access message, and a difference between the first power and the second power is within the specified power difference range.

In an example, configuring the specified power difference range for the terminal includes sending a system message indicating the specified power difference range through a physical broadcast channel.

In some examples, the processor is configured to compensate a reception power of the PUSCH of the first random access message based on the specified power difference range while receiving the first random access message.

In some examples, compensating the reception power of the PUSCH of the first random access message based on the specified power difference range while receiving the first random access message includes obtaining power relationship indication information carried by the first random access message, in which the power relationship indication information is configured to indicate a magnitude relationship between the first power and the second power; and compensating the reception power of the PUSCH of the first random access message based on the specified power difference range and the power relationship indication information, while receiving the first random access message.

In some examples, obtaining the power relationship indication information carried by the first random access message includes obtaining the power relationship indication information from uplink control information (UCI) of the first random access message.

In some examples, obtaining the power relationship indication information from the uplink control information (UCI) of the first random access message includes obtaining the power relationship indication information from the uplink control information (UCI) of the PUSCH of the first random access message.

In some examples, the processor is configured to send a specified type of second random access message back to the terminal in response to successfully parsing content of the PRACH of the first random access message and unsuccessfully parsing content of the PUSCH of the first random access message.

The specified type of second random access message includes a second power adjustment instruction, the second power adjustment instruction is configured to instruct the terminal to adjust the first transmission power to obtain a second transmission power for re-transmitting the first random access message.

The foregoing mainly takes the terminal and the base station as examples to introduce the solutions according to embodiments of the disclosure. It can be understood that, in order to implement the above-mentioned functions, the terminal and the base station include hardware structures and/or software modules corresponding to each function. In combination with the modules and algorithm steps of the examples described in embodiments disclosed in the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the disclosure.

Figure 7:
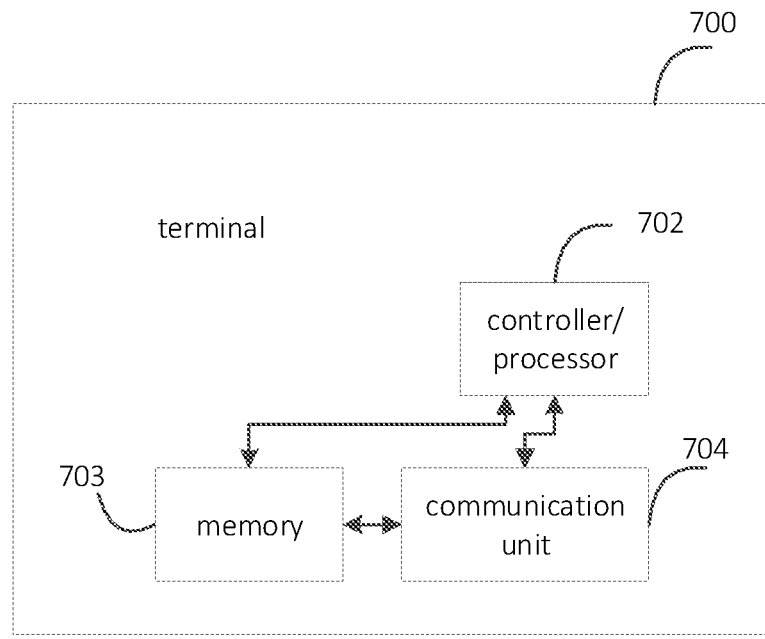
FIG. 7 is a schematic structural diagram illustrating a terminal according to an exemplary embodiment.

FIG. 7 is a schematic structural diagram illustrating a terminal according to an exemplary embodiment.

The terminal 700 includes a communication unit 704 and a processor 702. The processor 702 may also be a controller, which is represented as "controller/processor 702" in FIG. 7.

The communication unit 704 is configured to support the terminal to communicate with other network devices (for example, base stations, etc.).

Further, the terminal 700 may further include a memory 703. The memory 703 is configured to store program codes and data of the terminal 700.

It is understandable that FIG. 7 only shows a simplified design of the terminal 700. In practical applications, the terminal 700 may include any number of processors, controllers, memories, communication units, etc., and all terminals that can implement the embodiments of the disclosure are within the protection scope of the embodiments of the disclosure.

Figure 8:
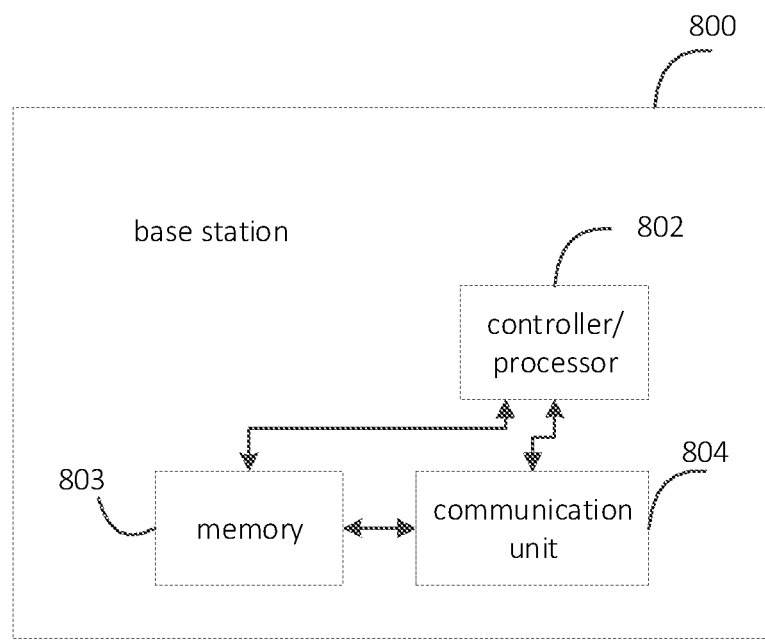
FIG. 8 is a schematic structural diagram illustrating a base station according to an exemplary embodiment.

FIG. 8 is a schematic structural diagram illustrating a base station according to an exemplary embodiment.

The base station 800 includes a communication unit 804 and a processor 802. The processor 802 may also be a controller, which is represented as "controller/processor 802" in FIG. 8. The communication unit 804 is configured to support the base station to communicate with other network devices (for example, terminals, other base stations, gateways, etc.).

Further, the base station 800 may further include a memory 803. The memory 803 is configured to store program codes and data of the base station 800.

It is understandable that FIG. 8 only shows a simplified design of the base station 800. In practical applications, the base station 800 may include any number of processors, controllers, memories, communication units, etc., and all base stations that can implement the embodiments of the disclosure are within the protection scope of the embodiments of the disclosure.

Those skilled in the art should be aware that, in one or more of the foregoing examples, the functions described in embodiments of the disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

Embodiments of the disclosure also provide a computer storage medium for storing computer software instructions used by the above-mentioned terminal, which includes a program designed for executing the above-mentioned method for transmitting a random access message.

Embodiment of the disclosure also provides a computer storage medium for storing computer software instructions used by the above-mentioned base station, which includes a program designed for executing the above-mentioned method for transmitting a random access message.

Those skilled in the art will easily think of other embodiments of the disclosure after considering the specification and practicing the invention disclosed herein. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as exemplary only, and the true scope and spirit of the disclosure are pointed out by the following claims.

It should be understood that the disclosure is not limited to the precise structure that has been described above and shown in the drawings, and various modifications and changes can be made without departing from its scope. The scope of the disclosure is only limited by the appended claims.

What is claimed is:

1. A method for transmitting a random access message, comprising:
   configuring, by a base station, a specified power difference range for a terminal; and
   receiving, by the base station, a first random access message sent by the terminal based on a first transmission power, wherein the first transmission power comprises a first power of a Physical Random Access Channel (PRACH) of the first random access message and a second power of a Physical Uplink Shared Channel (PUSCH) of the first random access message, and a difference between the first power and the second power is within the specified power difference range.

2. The method of claim 1, wherein configuring the specified power difference range for the terminal comprises:
   sending a system message indicating the specified power difference range through a physical broadcast channel.

3. The method of claim 1, further comprising:
   compensating a reception power of the PUSCH of the first random access message based on the specified power difference range while receiving the first random access message.

4. The method of claim 3, wherein compensating the reception power of the PUSCH of the first random access message based on the specified power difference range while receiving the first random access message comprises:
   obtaining power relationship indication information carried by the first random access message, wherein the power relationship indication information is configured to indicate a magnitude relationship between the first power and the second power; and
   compensating the reception power of the PUSCH of the first random access message based on the specified power difference range and the power relationship indication information, while receiving the first random access message.

5. The method of claim 4, wherein obtaining the power relationship indication information carried by the first random access message comprises:
   obtaining the power relationship indication information from uplink control information (UCI) of the first random access message.

6. The method of claim 5, wherein obtaining the power relationship indication information from the uplink control information (UCI) of the first random access message comprises:
   obtaining the power relationship indication information from the uplink control information (UCI) of the PUSCH of the first random access message.

7. The method of claim 1, further comprising:
   sending a specified type of second random access message back to the terminal in response to successfully parsing content of the PRACH of the first random access message and unsuccessfully parsing content of the PUSCH of the first random access message;
   wherein the specified type of second random access message comprises a second power adjustment instruction, the second power adjustment instruction is configured to instruct the terminal to adjust the first transmission power to obtain a second transmission power for re-transmitting the first random access message.

8. A device for transmitting a random access message, applied to a base station, the device comprising:
   a processor; and
   a memory, configured to store instructions executable by the processor;
   wherein the processor is configured to: execute a method for transmitting a random access message of claim 1.

9. A method for transmitting a random access message, comprising:
   obtaining, by a terminal, a specified power difference range configured by a base station;
   sending, by the terminal, a first random access message to the base station based on a first transmission power, wherein the first transmission power comprises a first power of a Physical Random Access Channel (PRACH) of the first random access message and a second power of a Physical Uplink Shared Channel (PUSCH) of the first random access message, and a difference between the first power and the second power is within the specified power difference range.

10. The method of claim 9, wherein obtaining the specified power difference range configured by the base station comprises:
    receiving system information sent by the base station through a physical broadcast channel; and
    obtaining the specified power difference range indicated by the system information.

11. The method of claim 9, wherein,
    the first random access message carries power relationship indication information, and the power relationship indication information is configured to indicate a magnitude relationship between the first power and the second power.

12. The method of claim 11, wherein,
    the power relationship indication information is contained in uplink control information (UCI) carried by the first random access message.

13. The method of claim 12, wherein,
    the power relationship indication information is contained in the uplink control information (UCI) carried by the PUSCH of the first random access message.

14. The method of claim 9, further comprising:
    obtaining a second transmission power in response to meeting a retransmission condition; and
    retransmitting the first random access message with the second transmission power;
    wherein the second transmission power comprises a third power of the PRACH of the first random access message and a fourth power of the PUSCH of the first random access message, a difference between the third power and the fourth power is within the specified power difference range, the third power is greater than or equal to the first power, and the fourth power is greater than or equal to the second power.

15. The method of claim 14, wherein obtaining the second transmission power comprises:
    obtaining a first power adjustment instruction, wherein the first power adjustment instruction is configured by a system signaling; and
    obtaining the second transmission power by adjusting the first transmission power based on the first power adjustment instruction.

16. The method of claim 14, wherein obtaining the second transmission power comprises:

obtaining a first power adjustment instruction in response to the retransmission condition being that no second random access message sent back by the base station is received within a specified period after the first random access message is sent, wherein the first power adjustment instruction is configured by a system signaling; and obtaining the second transmission power by adjusting the first transmission power based on the first power adjustment instruction.

17. The method of claim 14, wherein obtaining the second transmission power comprises:

obtaining a second power adjustment instruction in response to the retransmission condition being that a specified type of second random access message sent back by the base station is received within a specified period after the first random access message is received, wherein the second power adjustment instruction is carried by the specified type of second power access message; and obtaining the second transmission power by adjusting the first transmission power based on the second power adjustment instruction.

18. The method of claim 9, further comprising:

switching a transmission beam of the first random access message in response to that the first power equals to a maximum power of the PRACH of the first random access message or the second power equals to a maximum power of the PUSCH of the first random access message, based on the retransmission condition being met.

19. A non-transitory computer readable storage medium, having executable instructions stored thereon, wherein a processor in a terminal is configured to call the executable instructions to perform a method for transmitting a random access message of claim 9.

20. A device for transmitting a random access message, applied to a terminal, the terminal comprising:

a processor; and a memory, configured to store instructions executable by the processor;

wherein the processor is configured to obtain a specified power difference range configured by a base station;

send a first random access message to the base station based on a first transmission power, wherein the first transmission power comprises a first power of a Physical Random Access Channel (PRACH) of the first random access message and a second power of a Physical Uplink Shared Channel (PUSCH) of the first random access message, and a difference between the first power and the second power is within the specified power difference range.

* * * * *